(12) United States Patent
Armstrong et al.

(10) Patent No.: US 6,870,910 B1
(45) Date of Patent: Mar. 22, 2005

(54) METHOD AND SYSTEM FOR PERSONALIZING AN INTERACTIVE INTERFACE

(75) Inventors: Steven M. Armstrong, Nepean (CA); Hans Bergman, Ontario (CA)

(73) Assignee: Nortel Networks Limited (CA)

( * ) Notice: Subject to any disclaimer, the term of this patent is extended or adjusted under 35 U.S.C. 154(b) by 160 days.

(21) Appl. No.: 09/753,335

(22) Filed: Dec. 29, 2000

Related U.S. Application Data

(60) Provisional application No. 60/244,707, filed on Oct. 30, 2000.

(51) Int. Cl.[7] ................................................ H04M 1/64
(52) U.S. Cl. .............................. 379/88.22; 379/88.18; 379/88.21; 379/218.01; 379/76; 705/14
(58) Field of Search ........................... 379/88.22, 88.18, 379/67.1, 72, 76, 88.26, 88.21, 218.01; 358/1.15; 705/14

(56) References Cited

U.S. PATENT DOCUMENTS 4,602,129 A * 7/1986 Matthews et al. ....... 379/88.26
5,394,445 A * 2/1995 Ball et al. ................ 379/88.21
6,061,502 A * 5/2000 Ho et al. .................... 358/1.15
2002/0046086 A1 * 4/2002 Pletz et al. .................... 705/14

* cited by examiner

Primary Examiner—Fan Tsang
Assistant Examiner—Md Shafiul Alam Elahee
(74) Attorney, Agent, or Firm—Steubing McGuinness & Manavas LLP

(57) ABSTRACT

A personalization server is accessible to users via a network including a LAN and the Internet. The personalization server maintains information about how to personalize a call/message management interface provided for managing the user's calls and/or messages. A user can read web pages containing the information and provided by the personalization server at their own pace. Once they are satisfied that they understand what is expected of them, users follow a description on the web page that tells them the IVR phone number to call, and what code they should enter in order to record personalized prompts for call/message management options that are presented to incoming callers. The IVR which is used to accomplish the call/message management personalization is generic. It simply accepts option personalization access codes and then allows users to record something that matches the personalization code they have entered.

4 Claims, 3 Drawing Sheets

METHOD AND SYSTEM FOR PERSONALIZING AN INTERACTIVE INTERFACE

CROSS-REFERENCE TO RELATED APPLICATIONS

The present application is based on, and claims priority from, U.S. appln. Ser. No. 60/244,707, entitled METHOD AND SYSTEM FOR PERSONALIZING AN INTERACTIVE INTERFACE FOR A MESSAGING SERVICE, filed Oct. 30, 2000, commonly owned by the present assignee, the contents of which are incorporated herein by reference.

FIELD OF THE INVENTION

This invention relates generally to personal communications and messaging, and more particularly, to a system and method for allowing a user to personalize an interactive interface through which callers are allowed to communicate with or leave messages for the user.

BACKGROUND OF THE INVENTION

Many conventional call management and voice messaging systems include interactive voice response (IVR) systems through which incoming callers may attempt to reach a user serviced by the call management and/or voice messaging system. Such systems may further allow users to record personalized greetings that are played by the IVR system to incoming callers at various stages of call management and/or voice messaging functions (e.g. "I'm not at my desk right now, but if you'd like to leave a message, press 1"). However, personalizing an IVR system is often a difficult process if it is accomplished solely through the use of the IVR system itself, or even through use of another "personalization specific" IVR interface. This is because it may be difficult for users to grasp concepts or follow detailed directions if they are expected to just passively listen to an audio presentation. What can happen is that users will listen to an IVR presentation over and over again until they are finally able to understand what is expected of them (quite a frustrating experience), or just give up in disgust. One problem is that audio presentations are linear by nature, and are often very structured, thus allowing users little flexibility when it comes to understanding what is being presented. Audio presentations also force users to proceed at a pre-defined pace, one that may be too fast, or equally annoying, too slow for the user listening to the presentation.

The above problems may be exacerbated when the structure and number of options presented by the IVR, and for which personalized prompts can be recorded, can themselves be changed (i.e. by adding or deleting call management and/or messaging options). This may require reconfiguring the IVR to allow users to personalize their greetings, and may require users to repeat the frustrating experience of learning how to, and then re-recording their personalized greetings.

SUMMARY OF THE INVENTION

The present invention relates to a method and system for personalized call and message management.

A personalization server in accordance with the present invention is accessible to users via a network including a LAN and the Internet. The personalization server maintains information about how to personalize a call/message management interface provided for managing the user's calls and/or messages. A user can read the web pages provided by the personalization server at their own pace, follow links to subtopics of interest, see various examples, explore frequently asked questions, revisit certain topics multiple times, and essentially learn about the IVR customization process in the way that they are most comfortable. Once they are satisfied that they understand what is expected of them, users follow a detailed description on the web page that tells them the IVR phone number to call, and what code they should enter in order to record personalized prompts for call message management options that are presented to incoming callers. The IVR which is used to accomplish the call/message management personalization is generic. It simply accepts option personalization access codes and then allows users to record something that matches the personalization code they have entered.

In accordance with one aspect of the invention, a method for allowing a user to provide personalized prompts associated with communication management options presented by a first interactive voice response service on behalf of the user includes maintaining access codes respectively associated with the communication management options, receiving a selected access code from the user via a second interactive voice response service different from the first interactive voice service, recording the personalized prompt for the communication management option associated with the selected access code via the second interactive voice service, and storing the recorded personalized prompt in a location accessible for presentation by the first interactive voice response service.

In accordance with another aspect of the invention, a method for allowing a user to provide personalized prompts associated with communication management options presented by a first interactive voice response service on behalf of the user includes maintaining help information respectively associated with the communication management options, the help information for assisting the user in providing personalized prompts associated with the communication management options, receiving an option selection from the user via a network interface, retrieving the respective help information associated with the selected option, and providing the respective help information to the user via the network interface.

BRIEF DESCRIPTION OF THE DRAWINGS

The present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
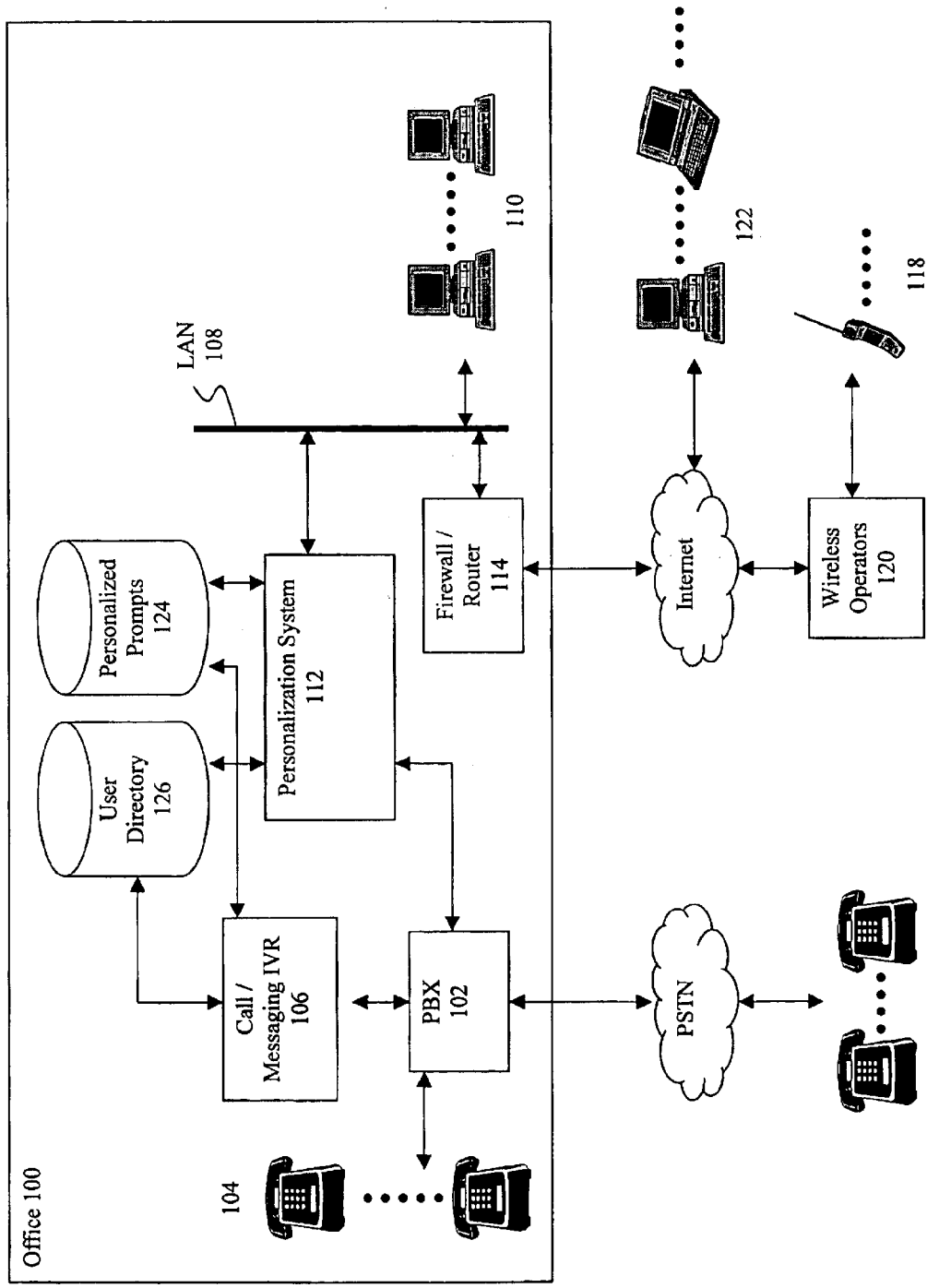
FIG. 1 illustrates an example topology for an implementation of the present invention in accordance with one embodiment.

FIG. 1 illustrates an example topology for an implementation of the present invention in accordance with one embodiment.

As can be seen, an office 100 includes a private branch exchange (PBX) 102 that connects a plurality of office phones 104, and a call/messaging interactive voice response (IVR) service 106. The PBX 102 can be, for example, a Meridian 1™ PBX switch from Nortel Networks. The call/messaging IVR 106 can be associated with any call management and/or voice messaging service that may be adapted for use in a telephony and/or messaging system so as to handle calls forwarded to it by PBX 102. In one example, the call/messaging IVR 106 is associated with a CallPilot™ unified messaging system from Nortel Networks or a Meridian Mail™ voice mail service from Nortel Networks. Such messaging systems may maintain voice mailboxes for one or more phones 104, which voice mailboxes may be referenced by the same number as is used to dial phones 104, or portions thereof (e.g. a 4 or 5 digit extension). In another example, the call/messaging IVR 106 is associated with a user-customizable unified communication management system such as that disclosed in co-pending U.S. appln. Ser. No. 09/753,340 (NOR-13400RO) entitled METHOD AND SYSTEM FOR PROVIDING UNIFIED COMMUNICATION MANAGEMENT BASED ON PRESENCE INFORMATION, filed Dec. 29, 2000, commonly owned by the present assignee, the contents of which are incorporated herein by reference. Such a unified communication management system can allow users associated with phones 104 to specify how callers can reach them via various communication means (e.g. a temporary phone or an administrative assistant's phone coupled to PBX 102, or a home phone or cell phone 116 coupled to the public switched telephone network (PSTN), or via text messaging sent to a PC 110 or wireless device 118 associated with the user) in various presence contexts. In any event, the users associated with phones 104 and/or who are serviced by the call management and/or messaging system associated with IVR 106 are listed in user directory 126, perhaps along with other system identification such as phone/mailbox number and password.

Call/messaging IVR 106 is operative to interact with incoming callers who are seeking communication with users of phones 104 via other of phones 104 or phones 116 coupled to the PSTN, for example. PBX 102 is configured to transfer incoming calls that have been placed to phones 104 instead to IVR 106 if, for example, the user associated with phone 104 does not answer the phone within a predetermined number of rings. When transferred, call/messaging IVR 106 can present a menu of options to the incoming caller (e.g. leave a voice mail or transfer to another phone). In the course of interacting with incoming callers and presenting such options, IVR 106 may play personalized prompts that the user has recorded, which prompts are stored in store 124.

A personalization system 112 in accordance with the present invention is coupled to the PBX 102 and to personalized prompts store 124 for interacting with users who call into the system and for allowing such users to change personalized prompts that are played by call/messaging IVR 106 in accordance with an aspect of the invention that will be described in more detail below. Personalization system 112 is also coupled to a local area network (LAN) 108 such as an Ethernet LAN for interacting with persons over the LAN 108 (and further to other persons via router 114 and the Internet) so as to provide information about options presented by call/messaging IVR 106 and how to record personalized prompts for such options in further accordance with an aspect of the present invention that will be described in more detail below.

The office 100 is coupled to the PSTN via the PBX 102 and to the Internet via a firewall/router 114 (both connections may be accomplished using a common collection of lines, for example, as should be apparent to those skilled in the art). The office 100 is connected to a plurality of PSTN phones 116 via the PSTN and a plurality of Internet appliances 122 (e.g. a PC, laptop, handheld or other wired device having browser functionality for communicating with remote devices using conventional protocols such as Hypertext Transport Protocol (HTTP)) via the Internet. The office 100 is also connected via the Internet for interacting with a plurality of wireless devices 118 (e.g. Wireless Access Protocol (WAP)-enabled cell phones and other devices having micro-browser functionality for displaying Wireless Markup Language (WML) pages) via their wireless operators 120. Preferably, the firewall/router 114 includes security extensions for providing secure access between the personalization system 112 and Internet appliances 122 and wireless operators 120 via the Internet.

Generally, the present invention allows a user having an account and/or message box maintained by a service associated with call/messaging IVR 106 (which users are listed in directory 126), to personalize prompts and greetings for call and message management options presented by IVR 106 in an orderly, simple and informed manner. The personalization system includes a web interface by which the user can access pages describing the various call and message management options presented by IVR 106, as well as describing how to personalize prompts for presenting such options. This web interface can be accessed by users via PCs 110, Internet appliances 122, and wireless devices 118. In addition to providing helpful explanations, the personalization system includes a generic IVR through which the user can quickly and simply record prompts that will be played by call/messaging IVR 106 to incoming callers. An advantage of the present invention is that users are allowed to personalize the greetings and prompts that are played to callers in a simple and informed manner. Meanwhile, the generic IVR provided by personalization system 112 can be universally used for all sets of options presented by IVR 106. Accordingly, when the sets of options presented by IVR 106 are changed, only the web pages presented by the personalization system need be changed.

In one example of the invention, call/management IVR 106, personalization server 112, personalized prompts store 124 and user directory 126 are jointly configured and maintained so that prompts for call and message management options played by call/management IVR 106, changed by personalization server 112 and stored by store 124 are properly indexed by user and option. Such joint configuration preferably also insures that changes in call and message management options presented by call/management IVR 106 (perhaps per individual user) are properly reflected in information pages presented by personalization server 112. Such joint configuration can be performed by administration functionality that need not be more fully described for an understanding of the present invention, as it will become apparent to those skilled in the art after being taught by the present disclosure. Additionally or alternatively, the maintenance and indexing of user call management/messaging options may be included in, or performed in response to, changes in call management/messaging configurations made by a user via the system described in co-pending U.S. appln. Ser. No. 09/753,340 (NOR-13400).

It should be noted that not all of the "office" components shown in FIG. 1 need be located at the same physical site. For example, the components may be located in different buildings. Other configurations may include shared or "virtual" PBX functionality that is available to different customers, who may or may not be located in the same office space. Moreover, the invention is not limited to telephony and/or messaging systems that include a PBX although such an example implementation is provided hereinbelow for ease of illustration.

Figure 2:
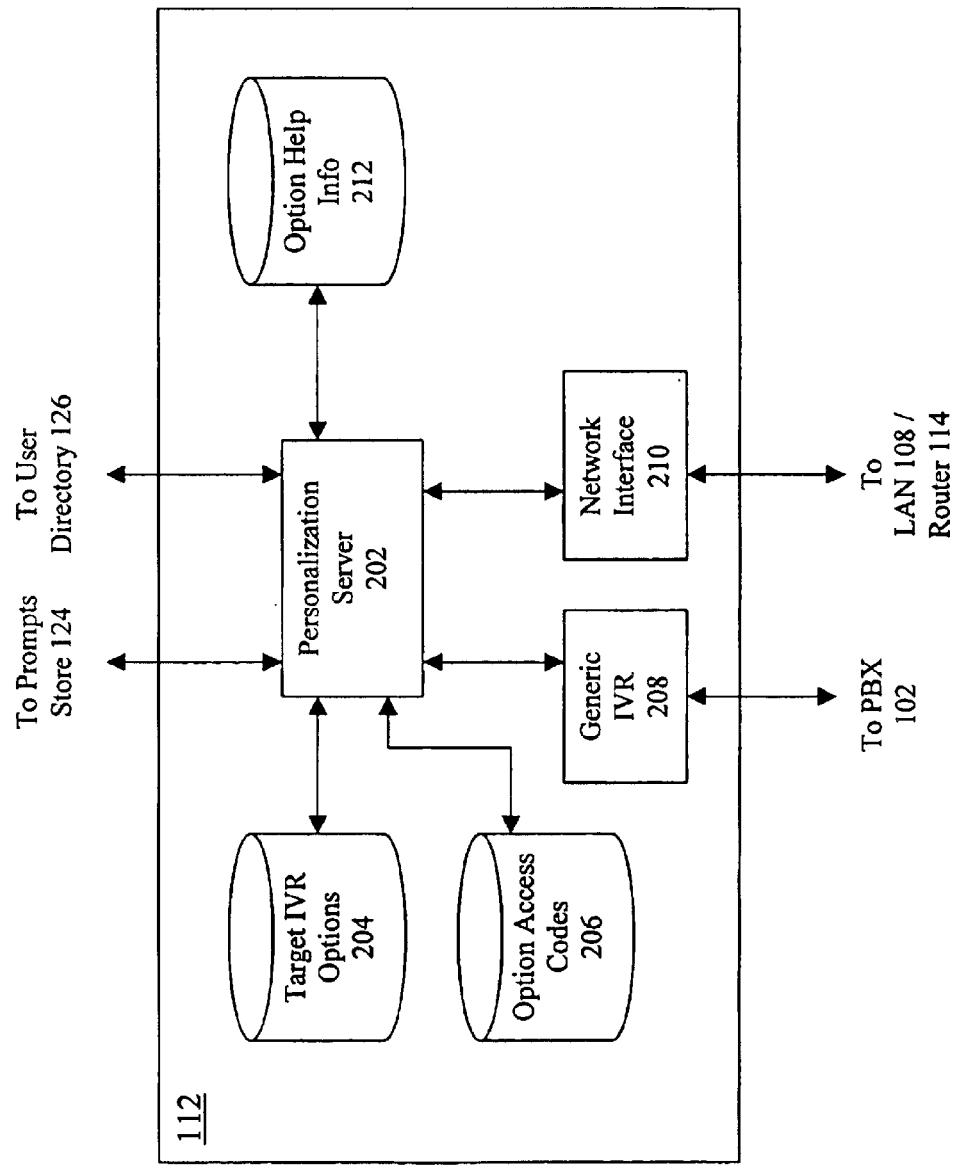
FIG. 2 illustrates an example of a personalization system in accordance with an embodiment of the invention as illustrated in FIG. 1 in more detail.

FIG. 2 illustrates an example of a personalization system in accordance with an embodiment of the invention in more detail. It should be noted that various alternatives to the system described below may exist, which alternatives may include fewer or additional components.

As shown in FIG. 2, a personalization system 112 includes a personalization server 202, a target IVR options store 204, an options access code store 206, an options help info store 212, a generic IVR 208 and a network interface 210.

In one example of the invention, the components of the personalization system illustrated in FIG. 2 are commonly provided in a Windows NT server (e.g. a Compaq ProLiant series server computer running Windows NT 4.0), with certain of the components provided as add-in cards and certain other of the components provided as software modules, or combinations thereof. It should be noted that, although shown separately for clarity of the invention, the IVR options store, option access codes store and options help info store can be commonly provided in a database such as a Sybase SQL database.

As explained above, it should be noted that the system can include administrator interface functionality and administrative information storage for providing underlying configurations that are used by the personalization system, which configurations may or may not include information stored in IVR options store 204, option access codes store 206 and options help info store 212. As also explained above, certain or all of such administrative functionality may be included in, or in response to, user-customizable call/messaging management options selected by a user of the system described in co-pending U.S. appln. Ser. No. 09/753,340 (NOR-13400).

The personalization server 202 is coupled to access codes store 206 for receiving option access codes that allow personalized prompts played by the target call management/messaging IVR 106 to be changed via generic IVR 208 (e.g. hardware and low-level drivers provided by Dialogic and software built on toolkits provided by Opus Maestro). For example, the option access code for recording a personalized prompt for a caller to leave a voice mail or to call another phone may be "22." Accordingly, when the user calls the number associated with the IVR 208, and is prompted to enter a personalization access code by the IVR 208 (after PBX 102 transfers the call to IVR 208 and after the IVR 208 asks the user to identify himself by phone/mailbox number, for example), the user only has to press "22" on the phone keypad to begin recording a personalized greeting (e.g. "Press 1 to leave a voice mail"). IR 208 includes functionality for decoding the key press sequence "22" from the dual tone multi-frequency (DTMF) sounds from the phone connection, and then interacts with personalization server 202 to verify that this access code is a valid option for the user. If so, IVR 208 presents a generic menu allowing the user to record the personalized prompt, and when finished, interacts with personalization server 202 to store the recorded prompt in store 124.

As should be apparent, generic IVR 208 need not be cognizant of all the call/messaging management options that are valid for each user, or even what options are associated with each access code. IVR 208 simply receives user identification and option access codes and verifies them with server 202. If verified, the IVR 208 provides generic recording functions for allowing the user to record personalized prompts, and when finished, for supplying the recorded prompt to server 202. Server 202 keeps track of the particular option associated with the entered access code and recorded prompt. Accordingly, when available call messaging options for individual or all users change, IVR 208 need not be changed at all.

Store 204 contains the lists of all call management/messaging options provided by the target call/messaging IVR 106 and for which the user is allowed to record personalized prompts (either one list of options for all users or different lists for each individual user (e.g. indexed by user phone/mailbox number), depending on the customizability of the IVR 106). For all possible options in store 204, personalization server 202 maintains in store 212 textual descriptions that explain what the call management/messaging option is for and examples of prompts to record for the option, as well as the corresponding option access code stored in store 206 and the phone number of the generic IVR 208 (which may or may not be included in hypertext for launching a dialer application). These descriptions may be maintained as web pages that can be accessed using uniform resource locators (URLs) that are displayed after a user has logged into the system, for example, or they may include templates into which text is inserted using a common gateway interface (CGI) application or Java Server Pages (JSPs) in response to a user identification and request, for example. Such web pages are preferably designed so that a user can read the web pages at their own pace, follow links to subtopics of interest, see various examples, explore frequently asked questions, and revisit certain topics multiple times. In an example of the invention where each individual user may present different call management/messaging options to incoming callers (e.g. in conjunction with customization features provided by co-pending U.S. appln. Ser. No. 09/753,340 (NOR-13400)), such information may be further indexed and/or flagged by user phone/mailbox number, for example. Personalization server 202 provides this information in response to requests from users who access the personalization server 202 through a web browser and network interface 210 (e.g. an Ethernet interface), for example. Accordingly, personalization server 202 can include web server functionality for interacting with such users (e.g. an HTTP server for communicating with a user's PC browser via the LAN 108 or the Internet).

It should be noted that other alternatives are possible. For example, the user may receive the textual descriptions and associated access codes from written documentation. Such written documentation may be in addition to, or alternatively to, descriptions for user-customizable call/messaging management options.

It should be further noted that, although shown separately for ease of illustration of the present invention, the personalization system 112 and call/messaging IVR 106 may be integrated together, perhaps also including a common IVR functionality and associated call/messaging management functionality.

Figure 3:
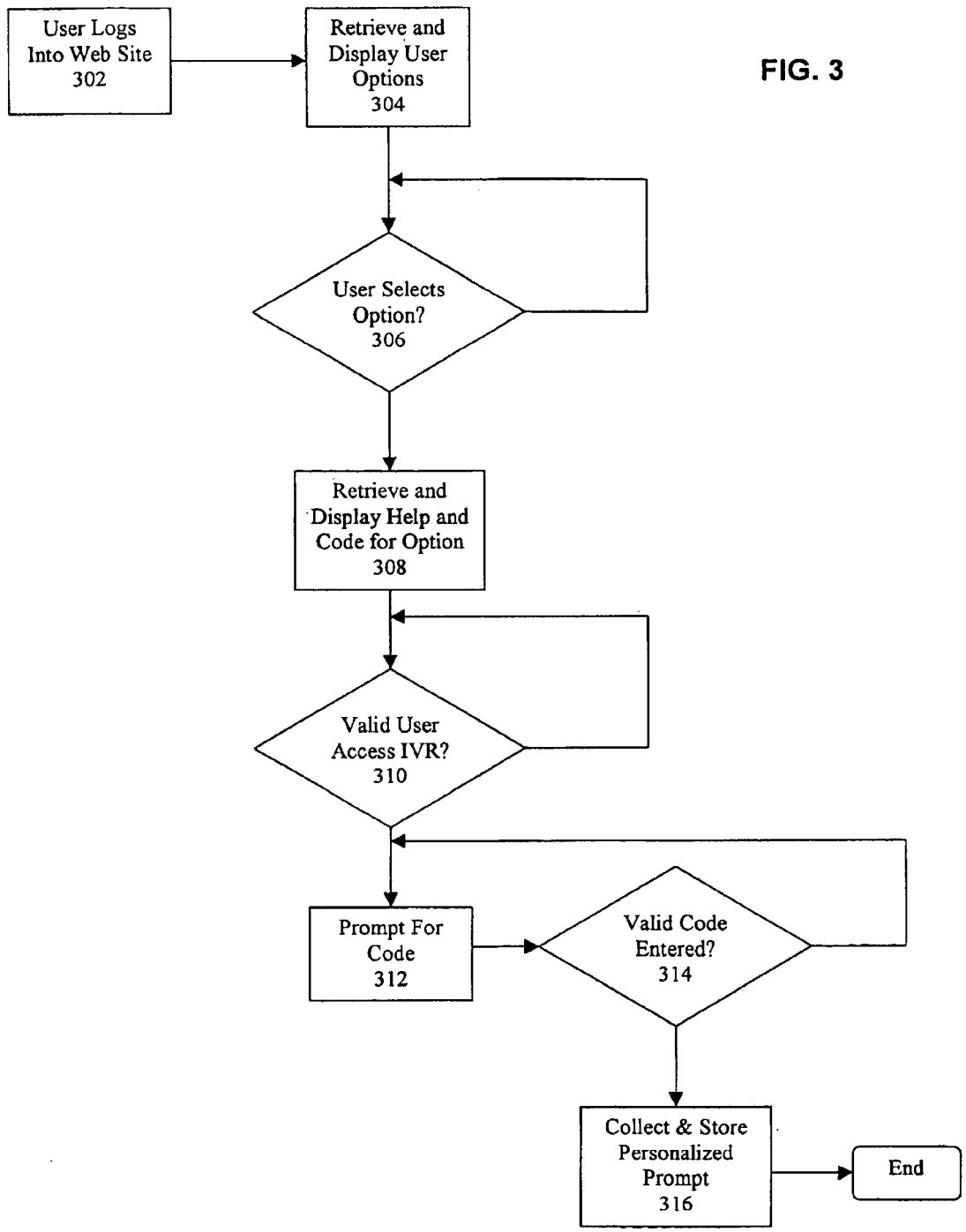
FIG. 3 is a flowchart illustrating an example method of allowing a user to personalize call and message management settings in accordance with one embodiment of the present invention.

FIG. 3 is a flowchart illustrating an example method of allowing a user to personalize call and message management options in accordance with an embodiment of the present invention. The following processing steps are for interaction with one user. Accordingly, it should be apparent that the order in which they are performed can be changed for a single or many users.

As shown in FIG. 3, processing begins in block 302 when a user logs into the personalization server 202 via network interface 210. This step may include retrieving the user's system identification (e.g. phone/mailbox number, and perhaps a password), which may be done by prompting the user for such identification or by automatically performing a lookup of the user's identification from the network address associated with the user's request to enter the site (e.g. via CGI request) in user directory 126. Next, in block 304 a list of the call/message management options that are available for prompt personalization for the user are retrieved and displayed. For example, all users may have the same options available for personalization, in which case the same list from store 202 is retrieved and displayed for all users. In another example, different users may have different call/message management options for presentation by target IVR 106. In such an example, the user's system identification may be used to lookup the list of options that are available for prompt personalization in store 202 (e.g. leave a voice mail or transfer to another phone), and then only these options are displayed. In either event, the list may be displayed as a list of options with associated hypertext pointing to URLs of web pages or scripts including further textual descriptions.

In block 306, it is determined whether the user has selected any of the displayed call/message management options for further information (e.g. by clicking on hypertext containing a URL pointing to a page maintained by personalization server 202 associated with the option of leaving a voice mail). If so, the personalization server 202 retrieves the corresponding descriptions from store 212, and also the associated quick access code for changing the prompt for the option (e.g. "22") via the IVR 208 from store 206 and presents them to the user via a network interface (block 308). It should be noted that the user may repeat steps 306 and 308 for some or all the different options for which personalized prompts can be recorded for the user.

The IVR 208 waits for the user to access its personalization interface. When the user calls the IVR 208 (using a phone number displayed on one of the web pages presented by the personalization server, for example), the user is prompted for a system identification (e.g. the user's phone/mailbox number), and possibly also a password. IVR 208 presents the received identification to personalization server 202 for verification. If the user has entered valid identification (determined in block 310), IVR 208 then prompts the user to enter the access code associated with the call/message management option for which the user wants to record a personalized prompt (block 312). When the user enters a code (e.g. "22" for recording a prompt for leaving a voice mail), the IVR 208 presents it to personalization server 202 for validation (determined in block 314). If a valid code has been entered by the user (as determined in block 314), the IVR allows the user to record a personalized prompt (e.g. "I'm not available right now, but if you'd like to leave me a message, press 1 now"), and when recording is completed, it is forwarded to personalization server 202 for storing in store 124 at the appropriate user and option index (block 316), perhaps overwriting a default prompt. If an invalid code is entered, the user is prompted again, perhaps after an error message is played.

After a user has recorded the appropriate personalized prompt, whenever an incoming caller to a phone associated with the user is handled by IVR 106, IVR 106 will play the recorded personalized prompt to the caller for the call/message management option associated with the prompt. For example, if the user has recorded a prompt for leaving a voice mail, and if an incoming call is forwarded to IVR 106 by PBX 102 (after the user hasn't answered the phone within a predetermined number of rings), the IVR 106 will play the recorded prompt to the incoming caller.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A method for allowing a user to provide personalized prompts associated with communication management options presented by a first interactive voice response service on behalf of the user, the first interactive voice response service for responding to calls to the user, the method comprising the steps of:

maintaining help information respectively associated with the communication management options on a device connected to the first interactive voice response service via the interface the help information for assisting the user in providing personalized prompts associated with the communication management options;

receiving an option selection from the user via a network interface;

retrieving the respective help information associated with the selected option, said help information including textual descriptions of the selected option for display on a graphic user interface;

providing the respective help information to the user via the network interface;

maintaining access codes respectively associated with the communication management options, the access codes for allowing the user to record personalized prompts via a second interactive voice response service, the second interactive voice response system for controlling how the first interactive voice response service responds to calls to the user, retrieving the respective access code associated with the selected option; and providing the respective access code to the user via the network interface.

2. A method according to claim 1, wherein the communication management options are indexed by user, the method further comprising the steps of:

receiving a user identification form the user via the network interface; and retrieving a list of available communication management options associated with the user in absence with the received user identification;

wherein the help information providing step is performed in accordance with the received user identification.

3. An apparatus for allowing a user to provide personalized prompts associated with communication management options presented by a first interactive voice response service on behalf of the user, the apparatus comprising:

means for maintaining help information respectively associated with the communication management options on a device connected to the first interactive voice response service via the internet the help information for assisting the user in providing personalized prompts associated with the communication management options, said help information including textual descriptions of the selected option for display on a graphic user interface;

means for receiving an option selection from the user via a network interface;

means for retrieving the respective help information associated with the selected option;

means for providing the respective help information to the user via the network interface;

means for maintaining access codes respectively associated with the communication management options, the access codes for allowing the user to record personalized prompts via a second interactive voice response service, wherein the first interactive voice response service is for handling requests to the user, and the second interactive voice response service is for controlling how the first interactive voice response service handles requests to the user;

means for retrieving the respective access code associated with the selected option; and means for providing the respective access code to the user via the network interface.

4. An apparatus according to claim 3, wherein the communication management options are indexed by user, the apparatus further comprising:

means for receiving a user identification from the user via the network interface; and means for retrieving a list of available communication management options associated with the user in accordance with the received user identification, wherein the help information providing means is operative in accordance with the received user identification.

* * * * *

UNITED STATES PATENT AND TRADEMARK OFFICE
CERTIFICATE OF CORRECTION

PATENT NO. : 6,870,910 B1
DATED : March 22, 2005
INVENTOR(S) : Armstrong

It is certified that error appears in the above-identified patent and that said Letters Patent is hereby corrected as shown below:

Column 2,
Line 64, delete "DOW" and insert -- now --.

Column 8,
Line 43, delete "interface" and insert -- internet, --.
Line 60, delete "," and insert -- : --.

Column 9,
Line 4, delete "absence" and insert -- accordance --.
Line 16, after "via the internet" insert -- , --.

Signed and Sealed this

Twenty-eighth Day of February, 2006

JON W. DUDAS
*Director of the United States Patent and Trademark Office*